J. ALLEN.
Keeping Oil Cool in Lamps.
No. 50,087.
Patented Sept. 26, 1865.
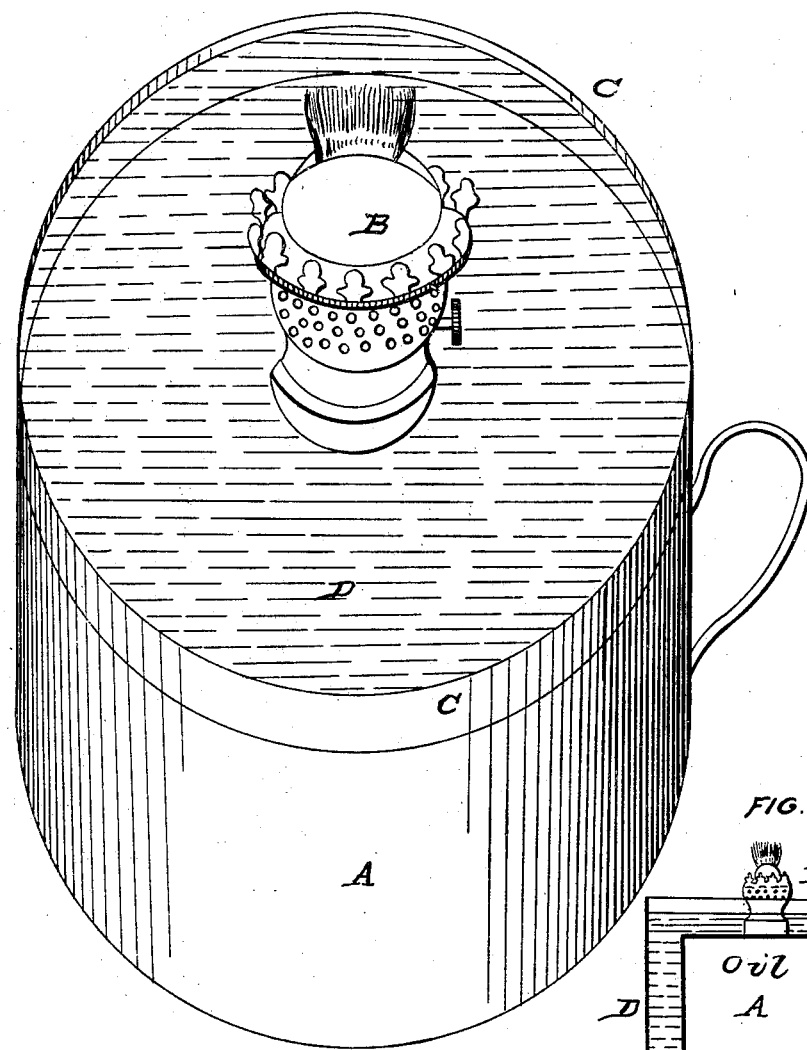
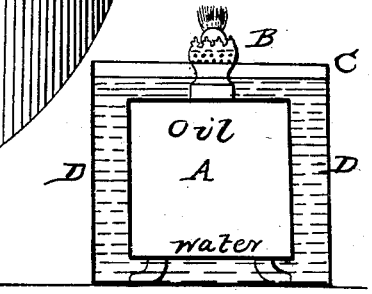

UNITED STATES PATENT OFFICE.

JOHN ALLEN, M. D., OF WASHINGTON, DISTRICT OF COLUMBIA.

IMPROVEMENT FOR KEEPING OIL COOL IN LAMPS OR BURNERS.

Specification forming part of Letters Patent No. 50,087, dated September 26, 1865.

*To all whom it may concern:*

Be it known that I, J. ALLEN, M. D., of the city of Washington, District of Columbia, have invented a new Mode of Keeping Cool the Contents of a Lamp or Burner; and I do hereby declare the following to be a full and exact description thereof, reference being had to the accompanying drawing, and to the letters of reference marked thereon, making a part of this specification.

The nature of my invention consists in placing an open reservoir or shallow basin of water between or around the vessel or reservoir that contains the fluid and the flame above, for the purpose of increasing the flame, making the flame burn steady and regular, cooling the tube or conductor that holds the wick, and preventing the generating of gas between the combustible fluid and the flame, so that an explosion will be prevented.

A represents a vessel containing the oil or fluid; B, the tube and wick above. Around the top edge of the vessel A, I have a raised rim or flange, C, either straight or curved, so that it forms an open basin or upper reservoir, D. This basin is filled with cool water. The wick is then lighted and the collar of the lamp and wick-tube are kept cool by the water surrounding the bottom of the collar and tube and the top of the vessel A is kept cool by the body of water at top, so that gas cannot be generated in the vessel A. The air continually passing over the water at top keeps the water cool, and the wick burns more steadily and does not flicker or flare or be so easily extinguished by a sudden draft of air; or the oil-vessel A may be wholly surrounded by water, as shown at Fig. 2, for the purpose of keeping cool the contents of the vessel A.

What I claim as my invention, and desire to secure by Letters Patent, is—

The placing of water on the top or around the reservoir A, as herein described, and for the purposes set forth.

JOHN ALLEN, M. D.

Witnesses:
    J. FRANKLIN REIGART,
    EDM. F. BROWN.